(12) United States Patent
Chen

(10) Patent No.: US 9,474,403 B2
(45) Date of Patent: Oct. 25, 2016

(54) DREGS/JUICE SEPARATION APPARATUS

(71) Applicant: Chien-Rong Chen, Kaohsiung (TW)

(72) Inventor: Chien-Rong Chen, Kaohsiung (TW)

( * ) Notice: Subject to any disclaimer, the term of this patent is extended or adjusted under 35 U.S.C. 154(b) by 372 days.

(21) Appl. No.: 14/053,654

(22) Filed: Oct. 15, 2013

(65) Prior Publication Data

US 2014/0216277 A1 Aug. 7, 2014

(30) Foreign Application Priority Data

Feb. 5, 2013 (TW) .............................. 102104397 A
Apr. 2, 2013 (TW) .............................. 102111926 A

(51) Int. Cl.
| | | |
|---|---|---|
| A23N 1/00 | (2006.01) | |
| A23L 1/317 | (2006.01) | |
| A23B 4/03 | (2006.01) | |
| A23P 1/00 | (2006.01) | |
| B30B 15/14 | (2006.01) | |
| B23D 25/02 | (2006.01) | |
| A47J 27/00 | (2006.01) | |
| A47J 43/046 | (2006.01) | |
| A47J 19/02 | (2006.01) | |

(52) U.S. Cl.
CPC ............. *A47J 27/004* (2013.01); *A47J 19/027* (2013.01); *A47J 43/046* (2013.01)

(58) Field of Classification Search
None
See application file for complete search history.

(56) References Cited

U.S. PATENT DOCUMENTS

| | | | | |
|---|---|---|---|---|
| 2,117,496 A | * | 5/1938 | Osuch .................... | A23N 1/003 366/206 |
| 2,147,632 A | * | 2/1939 | Bickford ................. | B65B 41/06 53/135.3 |
| 2,274,020 A | * | 2/1942 | Weightman ............ | A23N 1/003 99/485 |
| 2,619,139 A | * | 11/1952 | McKinley ............... | A23N 4/18 99/510 |
| 3,269,301 A | * | 8/1966 | Krause .................... | A23N 1/003 100/108 |
| 4,117,980 A | * | 10/1978 | Hartmann ............... | B02C 18/12 241/199.11 |
| 4,614,153 A | * | 9/1986 | Kurome ................. | A47J 19/027 99/511 |

(Continued)

FOREIGN PATENT DOCUMENTS

| | | |
|---|---|---|
| CN | 102727086 A | 10/2012 |
| TW | M350321 U | 2/2009 |
| TW | 201238540 A | 10/2012 |

*Primary Examiner* — David Angwin
*Assistant Examiner* — Gyounghyun Bae
(74) *Attorney, Agent, or Firm* — Alan D. Kamrath; Kamrath IP Lawfirm, P.A.

(57) ABSTRACT

A dregs/juice separation apparatus includes a base having a power element driving a shaft to rotate. A pin protrudes from a surface of the shaft. A container includes an opening coupled with the base. A cutter unit includes a guiding member mounted around the shaft. The guiding member includes at least one guiding groove. The pin of the shaft extends into the at least one guiding groove. The cutter unit is rotatable relative to the shaft and is movable relative to the shaft in a longitudinal direction. The cutter unit further includes a cutter portion connected to the guiding member. A dreg collecting member includes an opening sealed by a cover. Objects to be processed are placed into the dreg collecting member via the opening of the dreg collecting member. The shaft extends through the dreg collecting member. The dreg collecting member receives the cutter unit.

18 Claims, 12 Drawing Sheets

(56) References Cited

U.S. PATENT DOCUMENTS

| | | | | |
|---|---|---|---|---|
| 6,289,777 B1* | 9/2001 | Hartmann | ............... | B26F 1/04 83/30 |
| 6,606,939 B1* | 8/2003 | Tateno | ............... | A47J 19/022 241/169.1 |
| 8,066,426 B2* | 11/2011 | Sandford | ............... | A47J 43/046 366/205 |
| 2007/0282304 A1* | 12/2007 | Ogura | ............... | A61B 1/0011 604/526 |
| 2009/0092721 A1* | 4/2009 | Dravitzki | ............... | A23N 1/003 426/489 |
| 2010/0058941 A1* | 3/2010 | Rivera | ............... | A47J 19/02 99/513 |
| 2011/0056007 A1* | 3/2011 | Caywood | ............... | E03C 1/302 4/255.11 |
| 2011/0284118 A1* | 11/2011 | Kishi | ............... | B42B 5/126 140/92.3 |
| 2012/0070244 A1* | 3/2012 | Stern | ............... | B28D 1/146 408/1 R |

\* cited by examiner

DREGS/JUICE SEPARATION APPARATUS

BACKGROUND OF THE INVENTION

1. Field of the Invention

The present invention relates to a dregs/juice separation apparatus and, more particularly, to an apparatus suitable for multiple food stuffs for separating dregs and juice to allow easy subsequent processes on the dregs and juice after separation.

2. Description of the Related Art

In conventional juicing, vegetables and fruits are placed into a juicing device and juiced, and the juice and the dregs coexist in a container. After juicing, the dregs are separated from the juice. A type of the juicing device includes a filter to allow the juice to flow therethrough, and the dregs can be removed after juicing.

FIG. 1 shows a circulating/pulverizing food processor disclosed in Taiwan Utility Model Publication No. M350321. The food processor 9 includes a cutter 91 rotating at a high speed in a guiding tube 92. Foodstuffs including beans, cereals, mixed grains, or vegetables submersed in a liquid in a container 93 are continuously sucked into the guiding tube 92 together with the liquid and are pulverized by the cutter 91 rotating at the high speed. Pulverized foodstuffs are guided into the container 93 via holes 94 in the guiding tube 92, achieving the juicing purpose. Furthermore, the food processor 9 includes a heating element 95 to cook soybean milk or cereal juice. The food processor 9 further includes function keys 96 operable to drive the cutter 91 without activating the heating element 95 for simple juicing purposes.

The food processor 9 can integrate the juicing device and the cooking device as a single machine while allowing functional selections of juicing/cooking operation or simple juicing operation. However, the food processor 9 requires high speed rotation of the cutter 91 in the guiding tube 92 to continuously suck the juice mixed with beans, cereals, mixed grains, or vegetables in the container 93 into the guiding tube 92 for pulverization by the cutter 91 rotating at the high speed. However, an additional sieve is required to separate the dregs from the juice.

Furthermore, the guiding tube 92 has an open bottom, such that the dregs of the beans, cereals, and mixed grains can not be filtered and are, thus, cooked together with the juice during cooking. Thus, the dregs become slimy and adhere to the cutter 91, the guiding tube 92, the container 93 and the heating element 95, causing difficulties in and inconvenience to cleaning. Furthermore, since the dregs are not removed before cooking, the dregs adhered to the heating element 95 are continuously heated at a high temperature and, thus, cooked. As a result, the cooked juice smells burnt, adversely affecting the taste and quality of the juice.

FIG. 2 shows a dregs/juice separation apparatus disclosed in Taiwan Patent Publication No. 201238540 for fixing the disadvantages of the above circulating/pulverizing food processor. The dregs/juice separation apparatus 8 includes a base 81, a container 82 and a dreg collecting member 83. The base 81 includes a power element 811 for driving a shaft 812 to rotate. The shaft 812 includes a threaded portion 813 and an actuating portion 814. The container 82 includes an opening 821 for coupling with the base 81. The container 82 can receive or collect liquid and juice. The dreg collecting member 83 is made of a material permeable to the liquid and includes a shaft tube 831 and a rotational member 832. The shaft tube 831 includes an inner thread 833 threadedly engaged with and disengageable from the threaded portion 813 of the shaft 812. The rotational member 832 can rotate relative to the shaft 812 or engage with the actuating portion 814 of the shaft 812 by an engagement portion 834 to allow synchronous rotation.

By such an arrangement, when the power element 811 drives the shaft 812 to rotate in a first direction, the dreg collecting member 83 moves downward relative to the shaft 812 due to provision of the inner thread 833, causing the engagement portion 834 of the rotational member 832 to engage with the actuating portion 814 of the shaft 812. Thus, the rotational member 832 rotates together with the shaft 812 to cut or pulverize the objects to be processed. If the power element 811 drives the shaft 812 to rotate in a second direction, the engagement portion 834 of the rotational member 832 disengages from the actuating portion 814 of the shaft 812, causing an upper end of the inner thread 833 of the shaft tube 831 to engage with the threaded portion 813 of the shaft 812. Thus, the dreg collecting member 83 moves upward relative to the shaft 812 and rotates to create a centrifugal force to throw the juice out of the dreg collecting member 83, separating the dregs from the juice.

The above dregs/juice separation apparatus avoids the disadvantages of the conventional circulating/pulverizing food processor and, thus, provides use convenience. The present invention provides a novel dregs/juice separation apparatus for providing an enhanced separation effect.

SUMMARY OF THE INVENTION

The primary objective of the present invention is to provide a dregs/juice separation apparatus for reliably separating dregs and juice of foodstuffs, allowing a user to obtain the dregs and the juice more conveniently.

Another objective of the present invention is to provide a dregs/juice separation apparatus, and foodstuffs and water can be stored separately and then mixed, pulverized, harmonized, and processed by other subsequent processing through a preset operation, avoiding long-term submersion of the foodstuffs in the water.

A further objective of the present invention is to provide a dregs/juice separation apparatus permitting sole heating of the juice during a subsequent heating process to avoid the dregs from adhering to the dregs/juice separation apparatus and therefore avoiding undesired heating of the dregs, allowing easy cleaning of the dregs/juice separation apparatus.

The present invention fulfills the above objectives by providing a dregs/juice separation apparatus including a base having a power element driving a shaft to rotate. The shaft includes a pin protruding from a surface of the shaft. A container includes an opening coupled with the base. A cutter unit includes a guiding member mounted around the shaft. The guiding member includes at least one guiding groove. The pin of the shaft extends into the at least one guiding groove. The cutter unit is rotatable relative to the shaft and is movable relative to the shaft in a longitudinal direction of the shaft. The cutter unit further includes a cutter portion connected to the guiding member. A dreg collecting member includes an opening. Objects are adapted to be placed into the dreg collecting member via the opening of the dreg collecting member. The shaft extends through the dreg collecting member. The dreg collecting member receives the cutter unit. The opening of the dreg collecting member is sealed by a cover.

Preferably, a shaft seat is provided at a bottom end of the container and rotatably supports a lower end of the shaft.

Preferably, the shaft includes a first coupling portion, and the dreg collecting member includes a bottom end having a second coupling portion disengageably engaged with the first coupling portion.

In an example, the guiding member is a shaft tube. The cutter portion is connected to a bottom end of the shaft tube. The shaft tube includes a top end having a third coupling portion. The cover of the dreg collecting member includes a fourth coupling portion disengageably engaged with the fourth coupling portion.

In another example, the guiding member includes at least one helical member rotatably mounted around the shaft. The at least one helical member includes a helical groove forming the guiding groove. The at least one helical member includes two axial ends. First and second fixing seats are respectively connected to the two axial ends. The cutter portion is connected to the first fixing seat. The second fixing seat includes a side facing away from the at least one helical member. A third coupling portion is formed on the side of the second fixing seat. The cover of the dreg collecting member includes a fourth coupling portion disengageably engaged with the third coupling portion.

In an example, each of the third and fourth coupling portions includes a stop face and a guiding face. When the stop face of the third coupling portion couples with the stop face of the fourth coupling portion, the guiding member of the cutter unit drives the dreg collecting member to rotate in a single direction.

In another example, the third coupling portion includes a stop face and a guiding face, and the fourth coupling portion is a recess. When the third coupling portion couples with the fourth coupling portion, the guiding member of the cutter unit drives the dreg collecting member to rotate in a single direction.

In a further example, each of the first and second coupling portions includes a stop face and a guiding face. When the first coupling portion couples with the second coupling portion, the guiding member of the cutter unit drives the dreg collecting member to rotate in a single direction.

In still another example, the first coupling portion includes a stop face and a guiding face. The second coupling portion is a recess. When the first coupling portion couples with the second coupling portion, the guiding member of the cutter unit drives the dreg collecting member to rotate in a single direction.

In an example, the at least one helical member includes two helical members having the same hand direction. The two helical members are alternately disposed and spaced from each other by 180°. The pin includes two ends protruding out of the surface of the shaft and respectively extending into the helical grooves of the two helical members.

In an example, the base includes an upper base and a lower base. The lower base further includes a heating element. The container is mounted to the lower base. The heating element is adapted for heating the container. The lower base further includes a temperature controlling element.

In an example, the upper base is pivotably connected to the lower base.

In an example, the container includes a heating element and a temperature controlling element.

In an example, one of the base and the container includes a liquid level detecting element.

In an example, the pin protrudes from two opposite surfaces of the shaft. The number of the at least one guiding groove is even. Two ends of the pin respectively extend into the even numbered guiding grooves.

In an example, the at least one groove of the cutter unit is a helical groove having two ends. Each end of the at least one helical groove is a flat face.

In another example, the at least one groove of the cutter unit is a helical groove having two ends. Each end of the at least one helical groove is a concave face.

In an example, the lower base includes a reservoir adapted to receive a liquid. The liquid is adapted to be pumped into the container via a conduit.

In examples, the cover of the dreg collecting member includes at least one vent.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

DETAILED DESCRIPTION OF THE INVENTION

The term "first direction" used herein can be the clockwise direction or the counterclockwise direction. The term "second direction" used herein is a direction opposite to the first direction. Namely, the second direction is the counterclockwise direction if the first direction is the clockwise direction. The second direction is the clockwise direction if the first direction is the counterclockwise direction.

The terms "upper end" and "lower end" used herein respectively indicate the upper end and the lower end of the corresponding drawing sheet.

The term "upward" used herein represents movement of an object from the lower end to the upper end of the corresponding drawing sheet. The term "downward" used herein represents movement of an object from the upper end to the lower end of the corresponding drawing sheet.

The term "power element" used herein can be a motor that is controllable by a detection switch, a timing switch, or any program to rotate in the first or second direction, to stop, to rotate at different speeds, or to start instantly, which can be appreciated by one having ordinary skill in the art.

Figure 1:
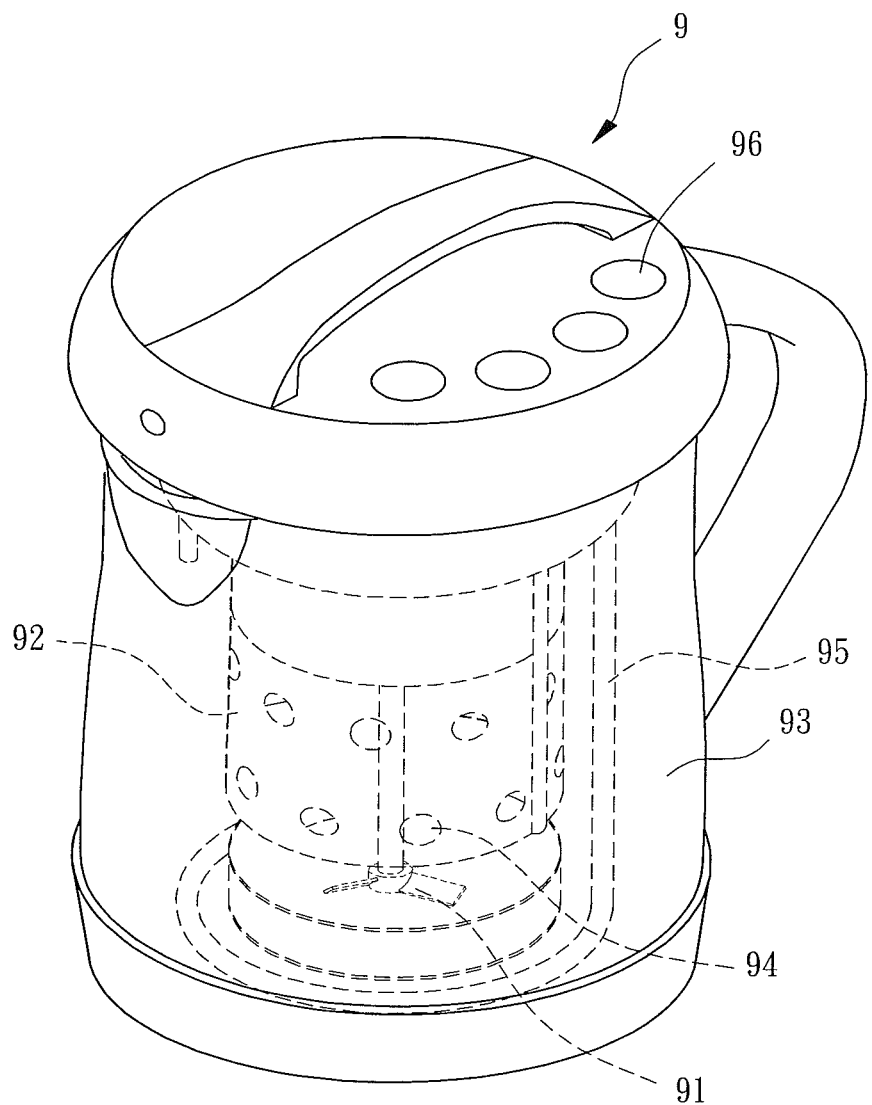
FIG. 1 is a perspective view of a conventional circulating/pulverizing food processor.
Figure 2:
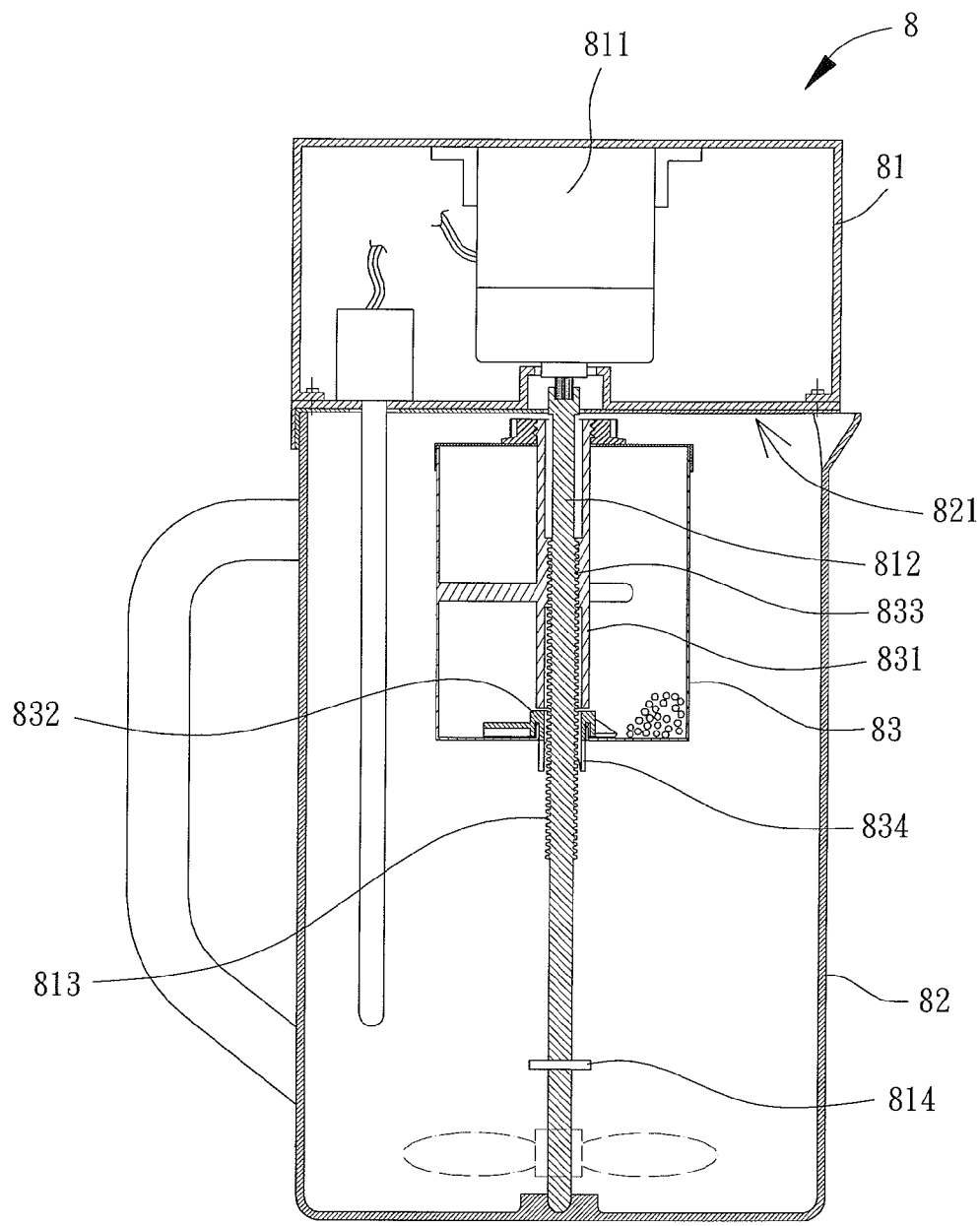
FIG. 2 is a cross sectional view of a conventional dregs/juice separation apparatus.
Figure 3:
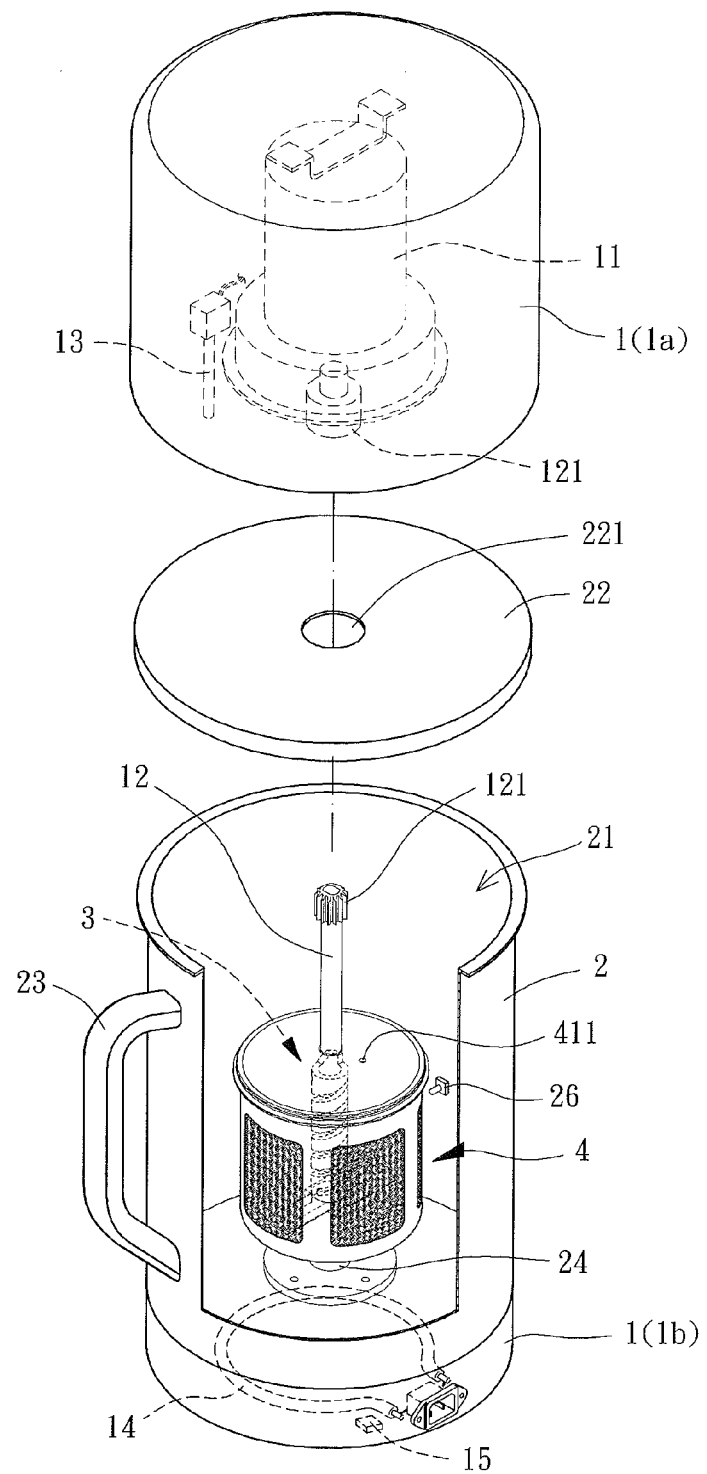
FIG. 3 is an exploded, perspective view of a dregs/juice separation apparatus of a first embodiment according to the present invention.
Figure 4:
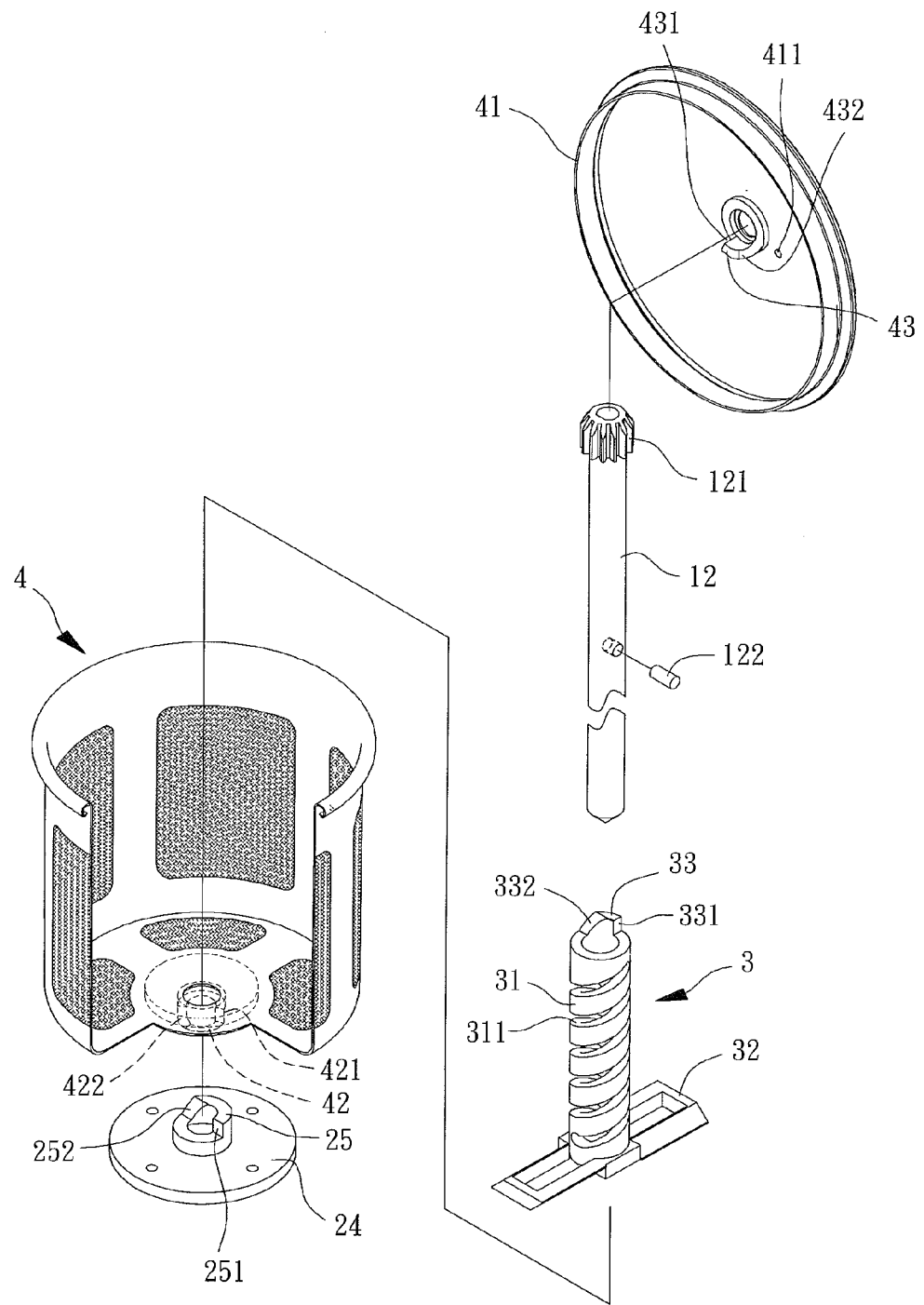
FIG. 4 is an exploded, perspective view of a portion of the dregs/juice separation apparatus of FIG. 3.
Figure 5:
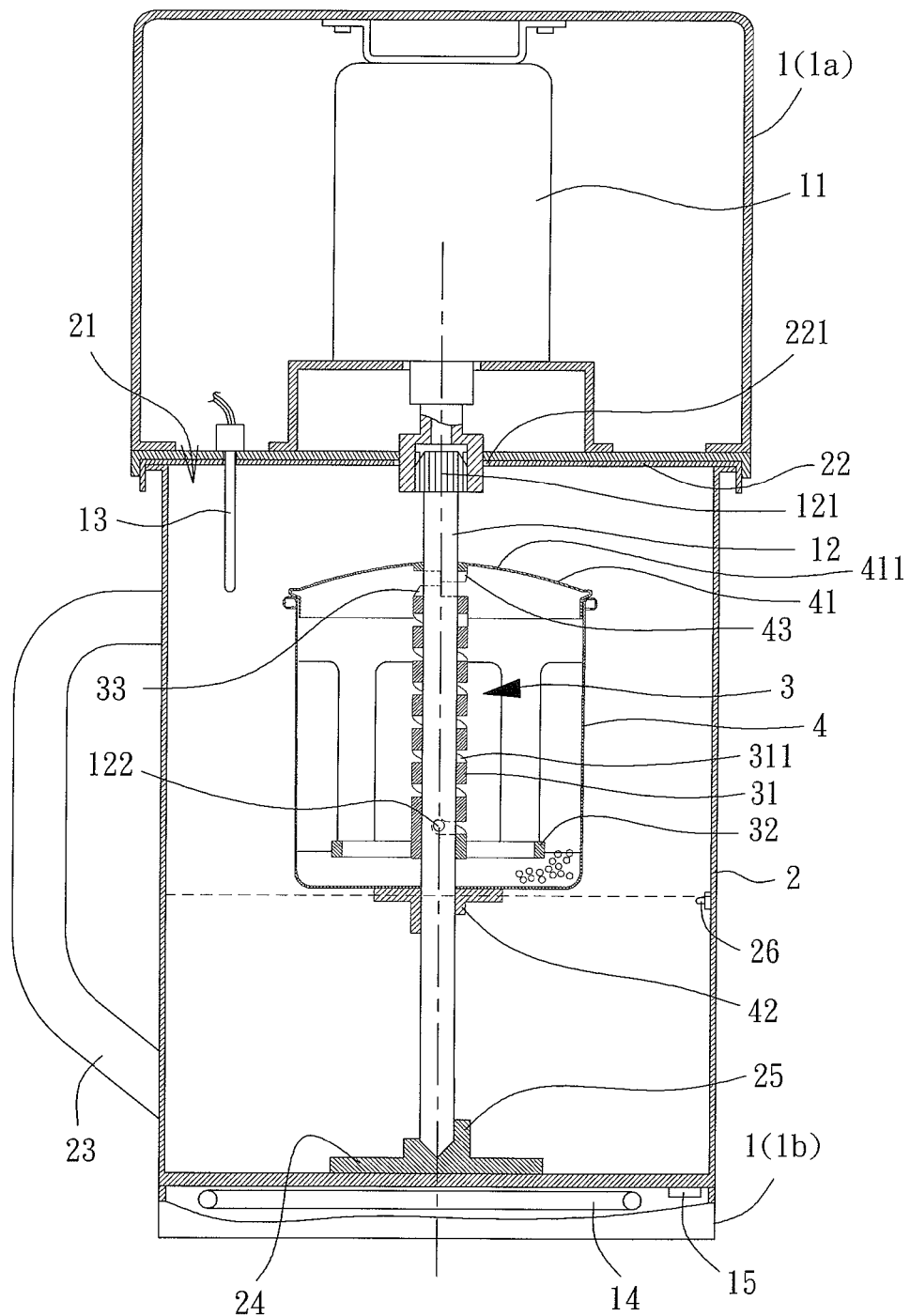
FIG. 5 is a cross sectional view of the dregs/juice separation apparatus of FIG. 3.

With reference to FIGS. 3-5, a dregs/juice separation apparatus of a first embodiment according to the present invention includes a base 1, a container 2, a cutter unit 3 and a dreg collecting member 4. The container 2 is coupled to the base 1. The dreg collecting member 4 receives the cutter unit 3 drivable by a shaft 12 of the base 1, such that the cutter unit 3 and the dreg collecting member 4 can move longitudinally relative to the container 2 and can rotate about the shaft 12.

The base 1 includes a power element 11 directly or indirectly driving the shaft 12 to rotate in a first direction or a second direction opposite to the first direction. The power element 11 can be a conventional motor. The shaft 12 can be integrally formed with the power element 11. In this embodiment, the shaft 12 includes a coupling portion 121 disengageably coupled with the power element 11. The coupling portion 121 can be detached from the shaft 12 to allow easy removal of the shaft 12 for cleaning purposes. At least one pin 122 is provided on the shaft 12 and protrudes outward from at least one surface of the shaft 12, such as protruding outward from two diametrically opposed surfaces of the shaft 12. In this embodiment, the shaft 12 includes a pin 122 protruding outward from a surface of the shaft 12.

The base 1 can be comprised of an upper base 1a and a lower base 1b. The upper and lower bases 1a and 1b can be detached from each other, as shown in FIG. 3. The lower base 1b supports the container 2. If desired, the lower base 1b can directly be coupled to a bottom end of the container 2. A liquid level detection element 13 can be mounted in the upper base 1a. In this embodiment, the liquid level detection element 13 is an upper level sensor. The liquid level detection element 13 can detect the level of the liquid in the container 2. The lower base 1b can include a heating element 14 for heating the container 2. The heating element 14 can include a temperature controlling element 15 to prevent overheating or dry heating of the heating element 14.

The container 2 can receive or collect liquid and juice. An opening 21 is defined in an upper end of the container 2 and can couple with and be closed by the base 1 (the upper base 1a). If desired, the opening 21 can be sealed by a lid 22 having an axial hole 221 through which the shaft 12 extends. The container 2 can further include a handle 23 for easy gripping.

The container 2 can be mounted to or integrally formed with the lower base 1b. A shaft seat 24 is provided on the bottom end of the container 2. The shaft seat 24 can rotatably support a lower end of the shaft 12, allowing stable rotation of the shaft seat 24. In order to position the dreg collecting member 4 at the bottom end of the container 2 for reliably cutting and pulverizing the objects to be processed, the shaft seat 24 can include a first coupling section 25 (FIGS. 4 and 5) having a stop face 251 and a guiding face 252.

The container 2 can further include a liquid level detecting element 26, such as a lower level sensor, such that the heating element 14 can not be activated if the liquid received in the container 2 does not reach a lower level limit.

The cutter unit 3 cuts and pulverizes the objects to be processed. The cutter unit 3 includes a guiding member 31 and a cutter portion 32 connected to the guiding member 31. In this embodiment, the guiding member 31 is in the form of a shaft tube mounted around the shaft 12. The guiding member 31 can rotate relative to the shaft 12 and can move relative to the shaft 12 in the longitudinal direction. The guiding member 31 includes at least one guiding groove 311 that is preferably a helical groove. The number of the at least one guiding groove 311 can be even. Two ends of the least one pin 122 protruding from the shaft 12 can extend into the at least one guiding groove 311. In this embodiment, the guiding member 31 has a guiding groove 311, and the pin 122 protrudes from the surface of the shaft 12 into the guiding groove 311. When the pin 122 moves in the guiding groove 311, the cutter unit 3 rotates relative to the shaft 12 and moves relative to the shaft 12 in the longitudinal direction of the shaft. Each of two ends of the guiding groove 311 can include a flat or concave face to provide a positioning effect. The cutter portion 32 is connected to a bottom end of the guiding member 31. In this embodiment, the cutter portion 32 extends outward from an outer periphery of the guiding member 31 in a radial direction perpendicular to the longitudinal direction. When the pin 122 on the shaft 12 reaches either end of the guiding groove 311, the cutter unit 3 is driven by the shaft 12 to rotate in the first or second direction. The cutter unit 3 can further include a third coupling portion 33 preferably located on a top end of the guiding member 31. The third coupling portion 33 also includes a stop face 331 and a guiding face 332.

With reference to FIGS. 3-5, the dreg collecting member 4 has a weight and is made of a material permeable to the liquid, preferably a metal material having meshes. The dreg collecting member 4 is received in the container 2 and includes an opening allowing the objects to be processed (such as coffee beans, soybeans, cereals, mixed grains or vegetables) to be placed into the dreg collecting member 4. The dreg collecting member 4 is extended through by the shaft 12 and receives the cutter unit 3. A cover 41 is used to seal the opening of the dreg collecting member 4. The cover 41 can include at least one positioning member (such as a snapping fastener) fixed in the opening of the dreg collecting member 4. The cover 41 can further include at least one vent 411 through which high-pressure gases generated in the dreg collecting member 4 during operation can be released, assuring use safety of the dregs/juice separation apparatus. The dreg collecting member 4 includes a second coupling portion 42 on an outer surface of a bottom end thereof. The cover 41 includes a fourth coupling portion 43 facing the bottom end of the dreg collecting member 4. Each of the second and fourth coupling portions 42 and 43 has a stop face 421, 431 and a guiding face 422, 432. The second coupling portion 42 can be coupled with the first coupling portion 25. The fourth coupling portion 43 can be coupled with the third coupling portion 33. Due to the provision of the stop face and the guiding face of each coupling portion, a single-direction ratcheting function can be provided to restrain the cutter unit 3 and the dreg collecting member 4, allowing the shaft 12 to drive the cutter unit 3 and the dreg collecting member 4 to rotate in one of the first and second directions and allowing the shaft 12 to disengage from the cutter unit 3 and the dreg collecting member 4 while rotating in the other direction, which will be described in detail hereinafter.

With reference to FIG. 5, when the dregs/juice separation apparatus according to the present invention is used to pulverize beans for extracting bean juice, water is received in the container 2, and bean products are placed into the dreg collecting member 4. The dreg collecting member 4 is in a higher position avoiding the bean products from submersing in the water. In this case, the pin 122 on the shaft 12 is located at the bottom end of the guiding groove 311. The dregs/juice separation apparatus is in a state ready for immediate use or preset use.

Figure 6:
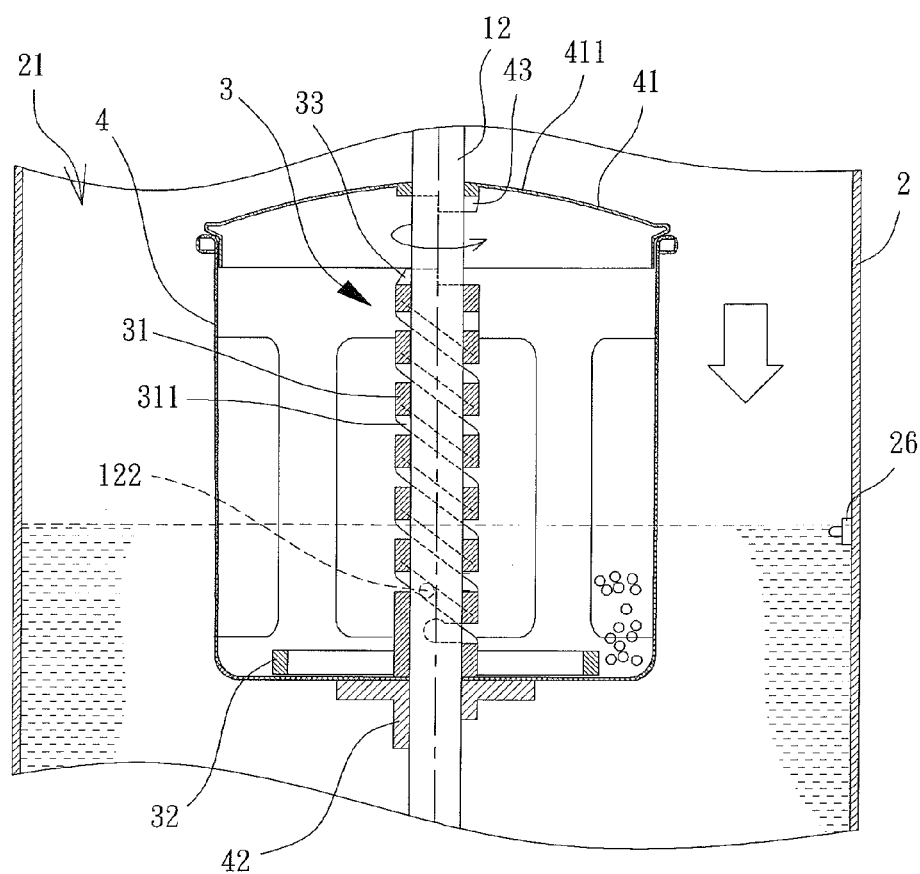
FIG. 6 is a portion of the dregs/juice separation apparatus of FIG. 5, with a dreg collecting member moved downward.

With reference to FIG. 6, when the power element 11 is activated immediately or after a preset period of time, the shaft 12 is driven by the power element 11 to rotate in the first direction indicated by the arrow, and the pin 122 on the shaft 12 moves along the guiding groove 311 of the cutter unit 3 and causes downward movement of the dreg collecting member 4. Thus, the cutter unit 3 can cut and pulverize the objects to be processed in the dreg collecting member 4.

Figure 7:
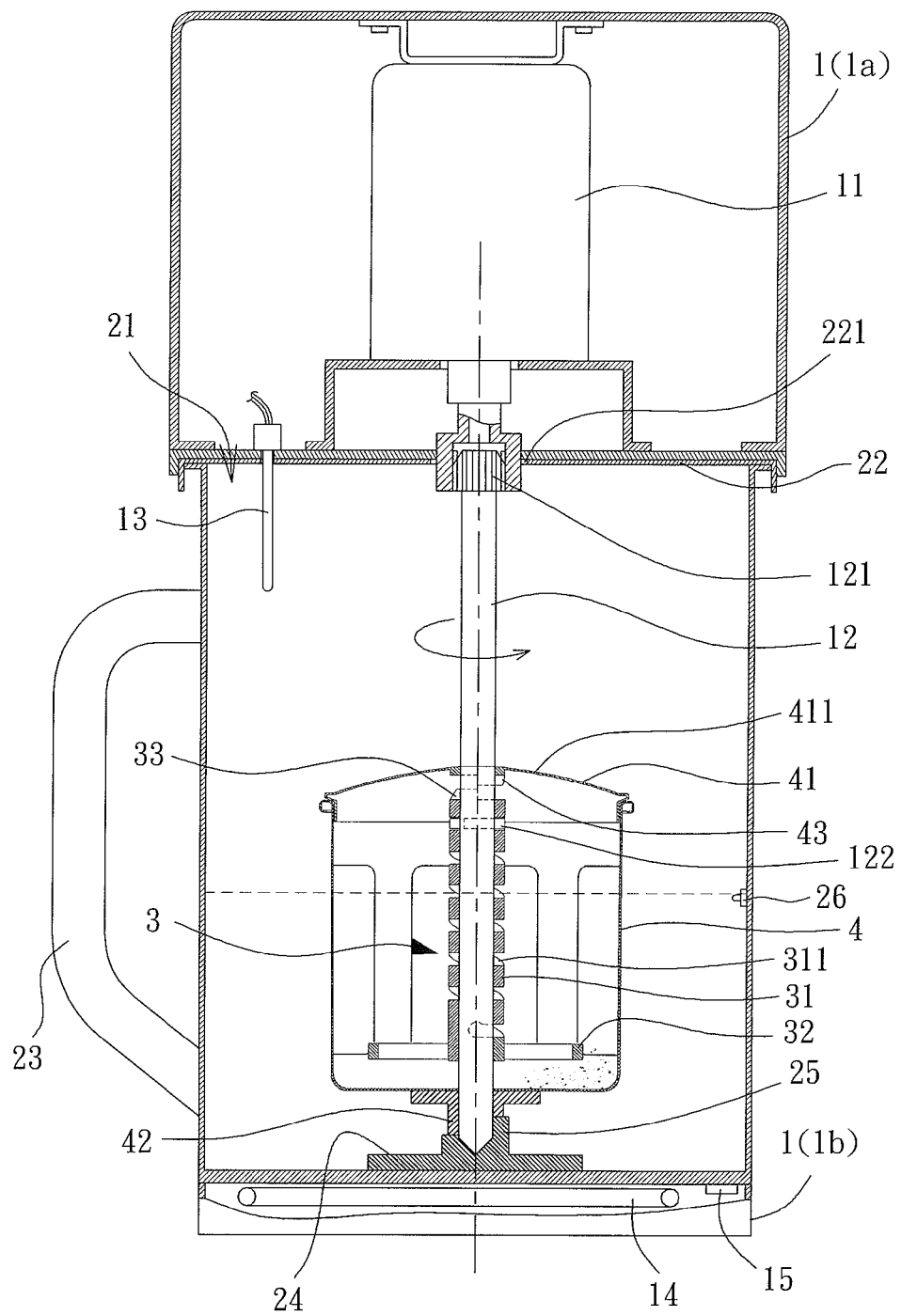
FIG. 7 is a view similar to FIG. 5, with the dreg collecting member moved to a lowest position.

With reference to FIG. 7, when the second coupling portion 42 at the bottom end of the dreg collecting member 4 engages with the first coupling portion 25 with the stop faces 251 and 421 contacting with each other, the dreg collecting member 4 stops rotating. In this case, the third coupling portion 33 of the cutter unit 3 is disengaged from the fourth coupling portion 43 on the cover 41. Furthermore, the pin 122 on the shaft 12 is located on and stopped by the upper end of the guiding groove 311. Thus, the cutter unit 3 is continuously driven by the shaft 12 to rotate, more reliably cutting and pulverizing the objects to be processed.

Figure 8:
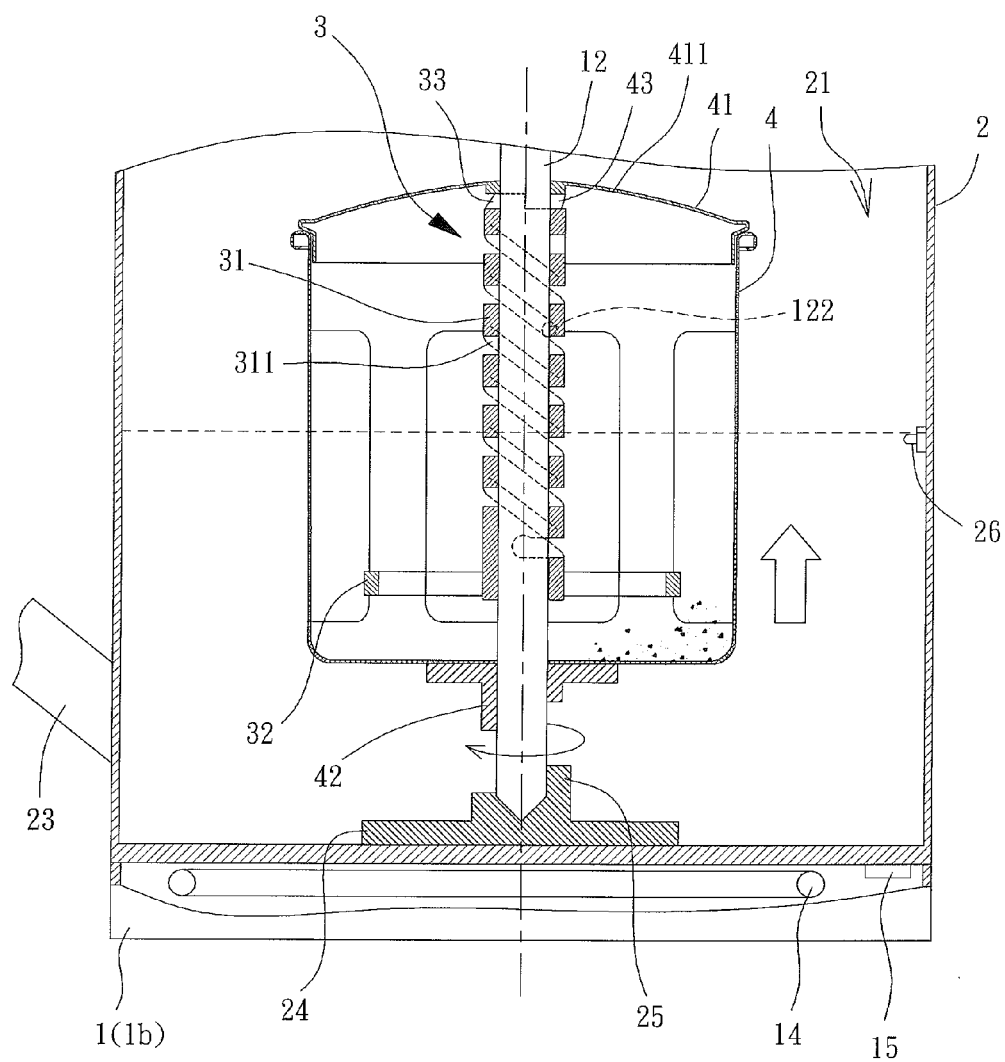
FIG. 8 is a view similar to FIG. 7, with the dreg collecting member moved upward.

With reference to FIG. 8, after the cutter unit 3 has reliably cut and pulverized the objects to be processed, the shaft 12 is driven by the power element 11 to rotate in the second direction, and the pin 122 on the shaft 12 moves along the guiding groove 311 to cause upward movement of the cutter unit 3 relative to the shaft 12 until the bottom end of the dreg collecting member 4 is preferably in a location higher than the highest level of the liquid in the container 2. In this case, the power element 11 can be stopped, and the liquid in the dreg collecting member 4 naturally flows downward into the container 2, achieving the purposes of separating the liquid.

Figure 9:
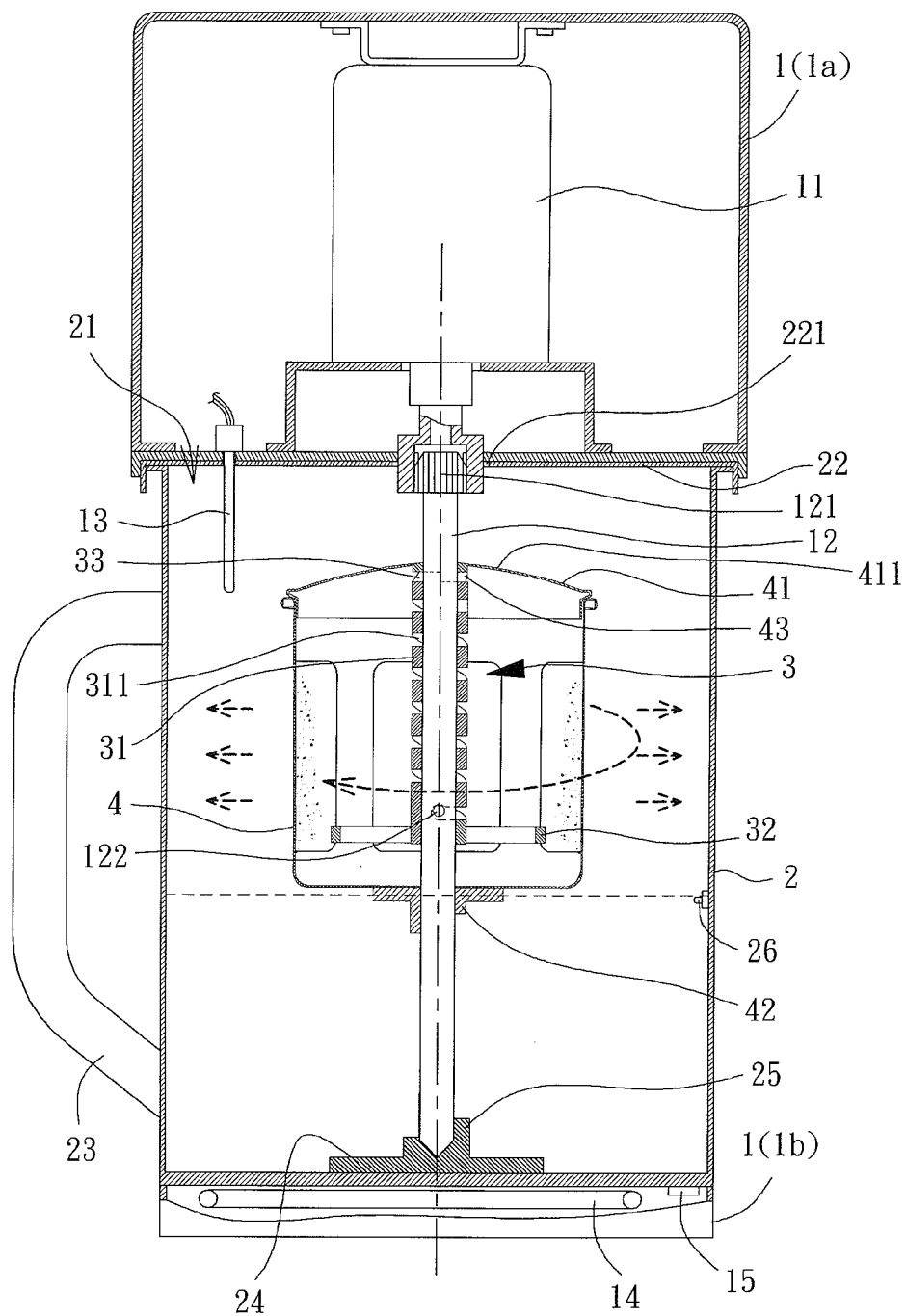
FIG. 9 is a view similar to FIG. 8, with the dreg collecting member moved to an uppermost position.

With reference to FIG. 9, when the third coupling portion 33 of the cutter unit 3 is coupled with the fourth coupling portion 43 of the cover 41, the pin 122 is in the lower end of the guiding groove 311, such that the shaft 12 drives the cutter unit 3 and the dreg collecting member 4 to rotate synchronously, creating a centrifugal force to throw the liquid out of the dreg collecting member 4, separating the dregs from the juice.

Figure 10:
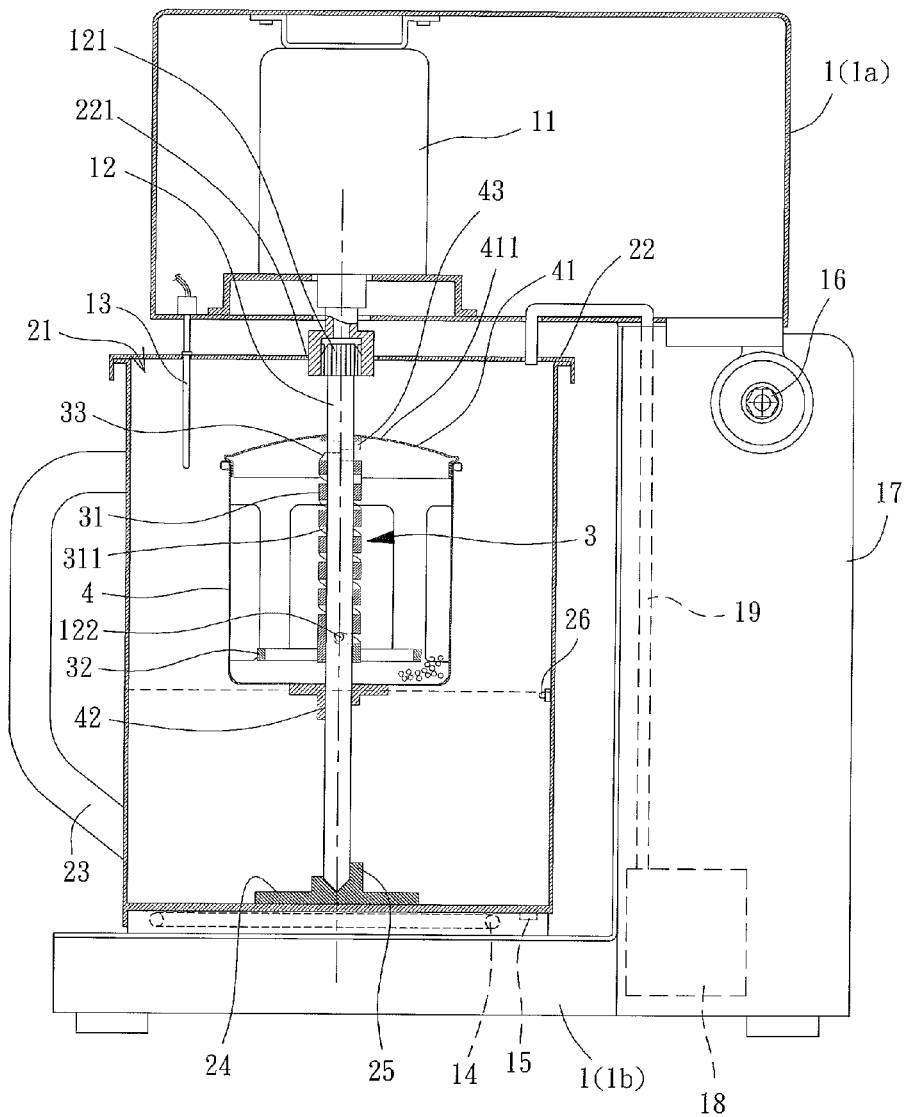
FIG. 10 is a cross sectional view of a dregs/juice separation apparatus of a second embodiment according to the present invention.

FIG. 10 shows a second embodiment according to the present invention, and the dregs/juice separation apparatus includes a base 1, a container 2, a cutter unit 3 and a dreg collecting member 4, which is substantially the same as the first embodiment. In this embodiment, the base 1 includes an upper base 1a and a lower base 1b pivotably connected to the upper base 1a by a pivot 16. The lower base 1b includes a heating element 14 for heating the container 2. The upper base 1a includes a reservoir 17 for receiving a liquid that can be pumped by a pump 18 through a conduit 19 into the container 2 for achieving the preset function. Liquid level detecting elements 13 and 26 are also used in this embodiment.

Figure 11:
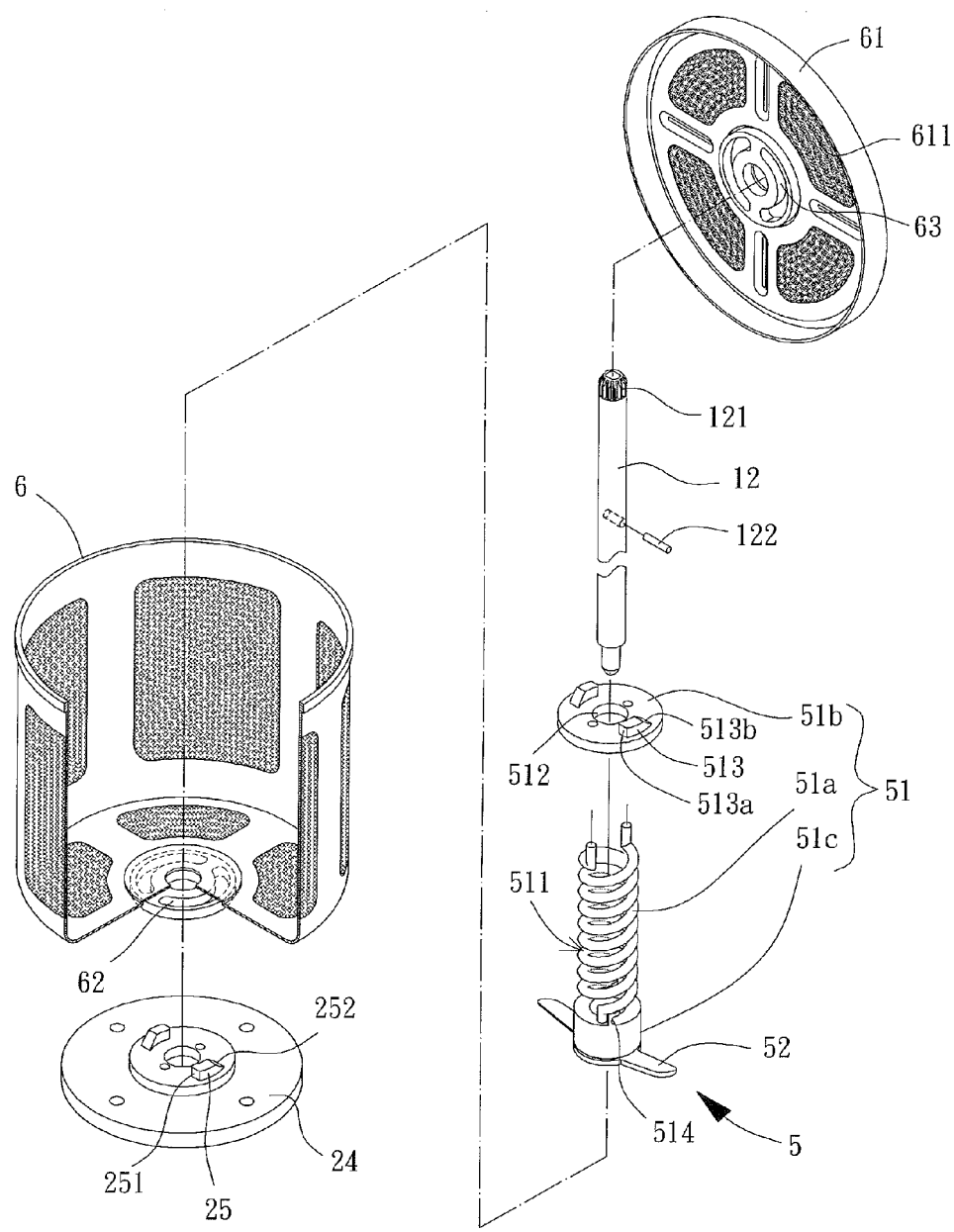
FIG. 11 is an exploded, perspective view of a dregs/juice separation apparatus of a third embodiment according to the present invention.
Figure 12:
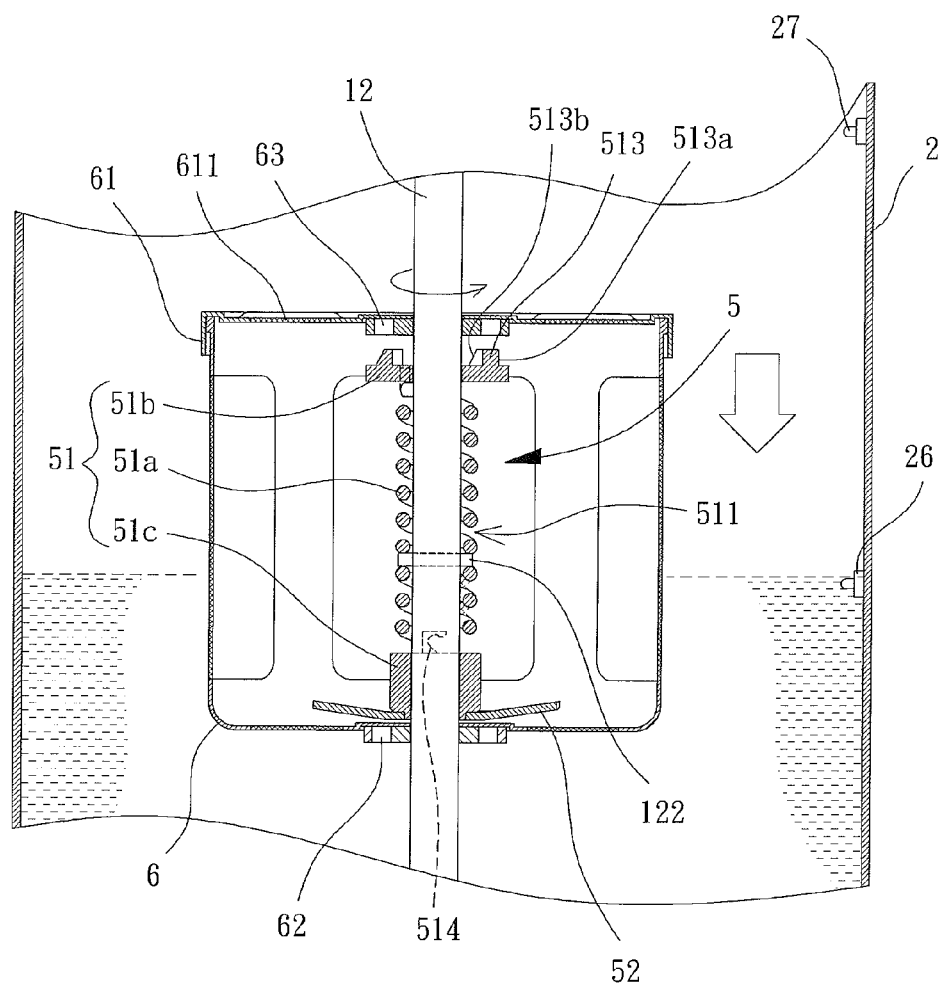
FIG. 12 is a partial, cross sectional view of the dregs/juice separation apparatus of FIG. 11.

FIGS. 11 and 12 show a third embodiment according to the present invention which is substantially the same as the first embodiment. The differences between the third embodiment and the first embodiment are the cutter unit 5 and the dreg collecting member 6, which will now be described.

The cutter unit 5 is used to cut and pulverize the objects to be processed. The cutter unit 5 includes a guiding member 51 and a cutter portion 52. In this embodiment, guiding member 51 includes at least one helical member 51a and two fixing seats 51b and 51c. The at least one helical member 51a is mounted around the shaft 12 and is located between the fixing seats 51b and 51c. Two axial ends of the at least one helical member 51a are respectively connected to the fixing seats 51b and 51c. The at least one helical member 51a includes a helical groove 511 into which the pin 122 on the shaft 12 extends. The cutter unit 5 can include two helical members 51a having the same hand direction and preferably having the same pitch and the same wire diameter. The two helical members 51a can be alternately disposed and spaced from each other by 180°. Two ends of the pin 122 protrude out of the surface of the shaft 12 and respectively extend into the helical grooves 511 of the two helical members 51a. The at least one helical member 51a can be a conventional compression spring to save the manufacturing costs for the cutter unit 5. Furthermore, the at least one helical member 51a is preferably a spring having a high elastic coefficient and is therefore not easy to deform, avoiding deformation of the at least one helical member 51a when the pin 122 on the shaft 12 moves along the helical groove 511.

Each fixing seat 51b, 51c has an axial hole 512 through which the shaft 12 extends. A third coupling portion 513 is provided on a side of the fixing seat 51b facing away from the helical member 51a. The third coupling portion 513 includes a stop face 513a and a guiding face 513b. The fixing seat 51c is connected to the cutter portion 52. The cutter portion 52 can be mounted to an outer periphery of the fixing seat 51c or integrally formed with the fixing seat 51c. The fixing seat 51c further includes a retaining portion 514 for coupling with the pin 122 on the shaft 12 when the pin 122 reaches the bottom end of the helical groove 511, retaining the dreg collecting member 6 in the predetermined location in the container 2.

The dreg collecting member 6 has a weight and is made of a material permeable to the liquid, preferably a metal material having meshes. The dreg collecting member 6 is received in the container 2 and includes an opening allowing the objects to be processed (such as coffee beans, soybeans, cereals, mixed grains, or vegetables) to be placed into the dreg collecting member 6. The dreg collecting member 6 is extended through by the shaft 12 and receives the cutter unit 5. A cover 61 is used to seal the opening of the dreg collecting member 6. The cover 61 can include at least one positioning member (such as a snapping fastener) fixed in the opening of the dreg collecting member 6. The cover 61 can further include at least one vent 611 through which high-pressure gases generated in the dreg collecting member 6 during operation can be released, assuring use safety of the dregs/juice separation apparatus.

Furthermore, the dreg collecting member 6 includes a second coupling portion 62 on an outer surface of a bottom end thereof. The cover 61 includes a fourth coupling portion 63 facing the bottom end of the dreg collecting member 6. Each of the second and fourth coupling portions 62 and 63 can be in the form of a recess. The recesses respectively receive the first coupling section 25 of the shaft seat 24 of the container 2 and the third coupling portion 513 on the top end of the cutter unit 5. Each of the first coupling section 25 and the third coupling portion 513 includes a stop face 251, 513a and a guiding face 252, 513b to provide a single-direction ratcheting function, allowing the shaft 12 to drive the cutter unit 5 and the dreg collecting member 6 to rotate in one of the first and second directions and allowing the shaft 12 to disengage from the cutter unit 5 and the dreg collecting member 6 in the other direction.

With reference to FIG. 12, in operation of the dregs/juice separation apparatus, the cutter unit 5 is driven by the shaft 12 to rotate in the first or second direction. The two ends of the pin 122 on the shaft 12 extend into the helical grooves 511 of the two helical members 51a. Thus, the dreg collecting member 6 moves upward or downward in the longitudinal direction of the shaft 12 when the pin 122 moves along the two helical grooves 511 during rotation of the shaft 12. The procedures of the dregs/juice separation apparatus of this embodiment are the same as those of the above embodiments and therefore not described in detail to avoid redundancy.

Furthermore, the liquid level detecting element 13 on the upper base 1a (FIG. 5) in the first and second embodiments can be located in the container 2 in this embodiment, such that the container 2 includes two liquid level detecting elements 26 and 27. The liquid level detecting element 26 is a lower level sensor, and the liquid level detecting element 27 is an upper level sensor above the lower level sensor. The liquid level detecting elements 26 and 27 can respectively detect the upper limit and the lower limit of the liquid level in the container 2 to assure safe use of the dregs/juice separation apparatus.

The dregs/juice separation apparatus according to the present invention uses a power element 11 to drive a shaft 12 to rotate. A cutter unit 3, 5 is mounted around the shaft 12 and is mounted in a dreg collecting member 4, 6. The cutter unit 3, 5 is driven by the shaft 12 to rotate in a first direction and is movable downward relative to the shaft 12 in the longitudinal direction, with the cutter unit 3, 5 and the dreg collecting member 4, 6 synchronously moving downward in the longitudinal direction. The cutter unit 3, 5 includes a cutter portion 32, 52 to cut or pulverize the objects to be processed in the dreg collecting member 4, 6. When the cutting or pulverization is finished, the cutter unit 3, 5 is driven by the shaft 12 to rotate in the second direction, with the cutter unit 3, 5 and the dreg collecting member 4, 6 synchronously moving upward in the longitudinal direction. On the other hand, the dreg collecting member 4, 6 can be continuously driven by the shaft 12 to rotate in the second direction to reliably throw the liquid out of the dreg collecting member 4, with the liquid collected by the container 2.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A dregs/juice separation apparatus comprising:
    a base including a power element driving a shaft to rotate, with the shaft including a pin protruding from a surface of the shaft;
    a container including an opening coupled with the base;
    a cutter unit configured for separating juice and including a guiding member mounted around the shaft, with the guiding member including at least one guiding groove, with the pin of the shaft extending into the at least one guiding groove, with the cutter unit rotatable relative to the shaft and movable relative to the shaft in a longitudinal direction of the shaft, with the cutter unit further including a cutter portion connected to the guiding member; and
    a dreg collecting member including an opening, with objects adapted to be placed into the dreg collecting member via the opening of the dreg collecting member, with the shaft extending through the dreg collecting member, with the dreg collecting member receiving the cutter unit configured for separating juice, with the opening of the dreg collecting member sealed by a cover, with the guiding member being a shaft tube, with the cutter portion connected to a bottom end of the shaft tube, with the shaft tube including a top end having a first primary coupling portion, with the cover of the dreg collecting member including a second primary coupling portion, with the first primary coupling portion disengageably engaged with the second primary coupling portion.

2. The dregs/juice separation apparatus as claimed in claim 1, with the container including a shaft seat at a bottom end thereof, with the shaft seat rotatably supporting a lower end of the shaft.

3. The dregs/juice separation apparatus as claimed in claim 2, with the shaft including a first auxiliary coupling portion, with the dreg collecting member including a bottom end having a second auxiliary coupling portion, with the second auxiliary coupling portion disengageably engaged with the first auxiliary coupling portion.

4. The dregs/juice separation apparatus as claimed in claim 1, with each of the first and second primary coupling portions including a stop face and a guiding face, wherein when the stop face of the first primary coupling portion couples with the stop face of the second primary coupling portion, the guiding member of the cutter unit drives the dreg collecting member to rotate in a single direction.

5. The dregs/juice separation apparatus as claimed in claim 1, with the first primary coupling portion including a stop face and a guiding face, with the second primary coupling portion being a recess, wherein when the first primary coupling portion couples with the second primary coupling portion, the guiding member of the cutter unit drives, the dreg collecting member to rotate in a single direction.

6. The dregs/juice separation apparatus as claimed in claim 3, with each of the first and second auxiliary coupling portions including a stop face and a guiding face, wherein when the first auxiliary coupling portion couples with the second auxiliary coupling portion, the guiding member of the cutter unit drives the dreg collecting member to rotate in a single direction.

7. The dregs/juice separation apparatus as claimed in claim 3, with the first auxiliary coupling portion including a stop face and a guiding face, with the second auxiliary coupling portion being a recess, wherein when the first auxiliary coupling portion couples with the second auxiliary coupling portion, the guiding member of the cutter unit drives the dreg collecting member to rotate in a single direction.

8. The dregs/juice separation apparatus as claimed in claim 1, with the base including an upper base and a lower base, with the lower base further including a heating element, with the container mounted to the lower base, with the heating element adapted for heating the container, with the lower base further including a temperature controlling element.

9. The dregs/juice separation apparatus as claimed in claim 8, with the upper base pivotably connected to the lower base via a pivot.

10. The dregs/juice separation apparatus as claimed in claim 8, with the lower base including a reservoir, with the reservoir adapted to receive a liquid, with the liquid adapted to be pumped into the container via a conduit.

11. The dregs/juice separation apparatus as claimed in claim 1, with the container including a heating element and a temperature controlling element.

12. The dregs/juice separation apparatus as claimed in claim 1, with one of the base and the container including a liquid level detecting element.

13. The dregs/juice separation apparatus as claimed in claim 1, with the pin protruding from two opposite surfaces of the shaft, with a number of the at least one guiding groove being even, with two ends of the pin respectively extending into the at least one guiding groove having the number which is even.

14. The dregs/juice separation apparatus as claimed in claim 1, with the at least one guiding groove of the cutter unit being a helical groove, with the helical groove including two ends, with each of the two ends of the helical groove being a flat face.

15. The dregs/juice separation apparatus as claimed in claim 1, with the at least one guiding groove of the cutter unit being a helical groove, with the helical groove including two ends, with each of the two ends of the helical groove being a concave face.

16. The dregs/juice separation apparatus as claimed in claim 1, with the cover of the dreg collecting member including at least one vent.

17. A dregs/juice separation apparatus comprising:
a base including a power element driving a shaft to rotate, with the shaft including a pin protruding from a surface of the shaft;
a container including an opening coupled with the base;
a cutter unit configured for separating juice and including a guiding member mounted around the shaft, with the guiding member including at least one guiding groove, with the pin of the shaft extending into the at least one guiding groove, with the cutter unit rotatable relative to the shaft and movable relative to the shaft in a longitudinal direction of the shaft, with the cutter unit further including a cutter portion connected to the guiding member; and
a dreg collecting member including an opening, with objects adapted to be placed into the dreg collecting member via the opening of the dreg collecting member, with the shaft extending through the dreg collecting member, with the dreg collecting member receiving the cutter unit configured for separating juice, with the opening of the dreg collecting member sealed by a cover, with the guiding member including at least one helical member rotatably mounted around the shaft, with the at least one helical member including a helical groove forming the at least one guiding groove, with the at least one helical member including two axial ends, with first and second fixing seats respectively connected to the two axial ends, with the cutter portion connected to the first fixing seat, with the second fixing seat including a side facing away from the at least one helical member, with a first primary coupling portion formed on the side of the second fixing seat, with the cover of the dreg collecting member including a second primary coupling portion, with the first primary coupling portion disengageably engaged with the second primary coupling portion.

18. The dregs/juice separation apparatus as claimed in claim 17, with the at least one helical member including two helical members, with the two helical members having a same hand direction, with the two helical members alternately disposed and spaced from each other by 180°, with the pin including two ends protruding out of the surface of the shaft and respectively extending into the two helical grooves of the two helical members.

* * * * *